May 8, 1928.  1,669,331
E. W. FULLILOVE
SEED FEEDING AND SPACING ATTACHMENT FOR PLANTERS
Original Filed May 20, 1925    2 Sheets-Sheet 1
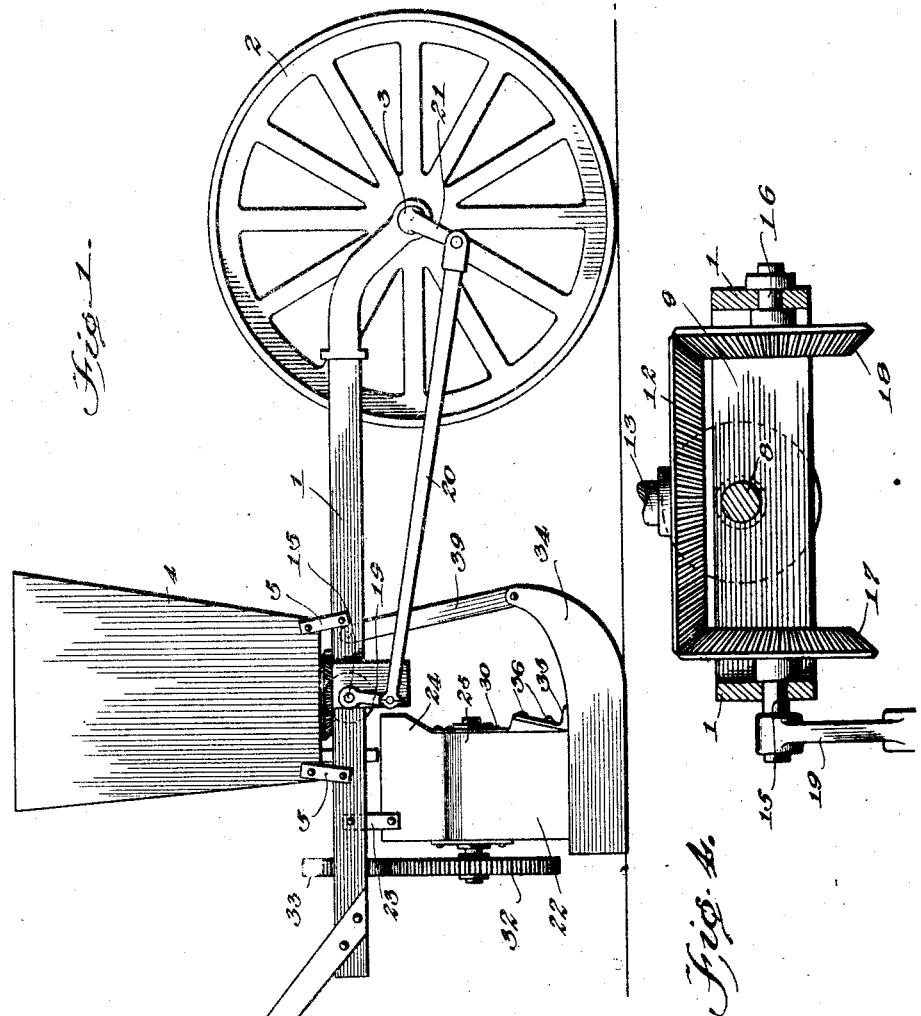
WITNESSES
INVENTOR
E. W. Fullilove,
BY
ATTORNEYS May 8, 1928. 1,669,331
E. W. FULLILOVE
SEED FEEDING AND SPACING ATTACHMENT FOR PLANTERS
Original Filed May 20, 1925 2 Sheets-Sheet 2
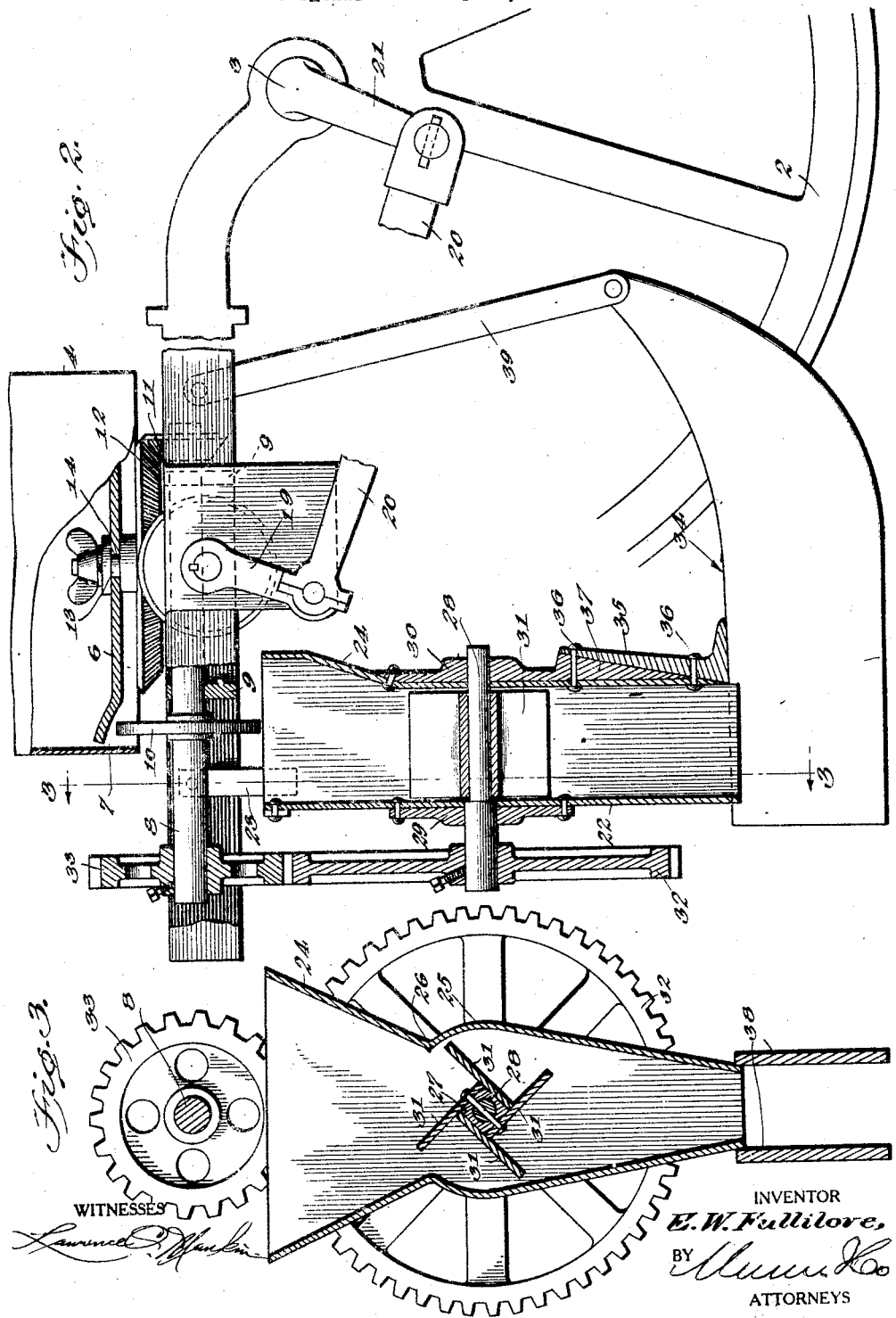
INVENTOR
E. W. Fullilove,
BY
ATTORNEYS
WITNESSES Patented May 8, 1928.

1,669,331

UNITED STATES PATENT OFFICE.

EDGAR W. FULLILOVE, OF SHREVEPORT, LOUISIANA.

SEED FEEDING AND SPACING ATTACHMENT FOR PLANTERS.

Application filed May 20, 1925, Serial No. 31,625. Renewed February 13, 1928.

My invention is a seed feeding attachment for planters of the type adapted for use in planting cotton seeds, and it consists in the combinations, constructions and arrangements herein described and claimed.

An object of the invention is the provision of an attachment for a planter of ordinary construction which will afford facilities for controlling the dropping of seeds from the planter so that seeds may be dropped at desirable intervals in a desirable quantity, whereby the subsequent work of thinning out the plants which grow from the dropped seeds in order to obtain a proper stand of plants will be considerably less than is usual and an economy in the use of seeds to plant a given area will be effected.

A further object of the invention is the provision of an attachment of the character described which can be conveniently and easily atttached to or removed from a planter of ordinary construction.

A still further object of the invention is the provision of an attachment of the character described of a novel valve for controlling the dropping of seeds and means whereby the valve will be operated by power derived from a moving part of the tractor.

Other objects and advantages of the invention will be apparent from the following description, considered in conjunction with the accompanying drawings, in which Figure 1 is a side elevation of a planter equipped with a seed feeding attachment embodying the invention, Figure 2 is a relatively enlarged view, partly in vertical section and partly in side elevation, showing the details of construction of the seed feeding attachment and the means for supporting the attachment on the planter and for controlling the dropping of seeds through the attachment.

Figure 3 is a section substantially along the line 3—3 of Figure 2,

Figure 4 is a section substantially along the line 4—4 of Figure 2.

In the drawings, I show the improved attachment applied to one form of planter of the type having a boot through which seed is dropped. It is to be understood however that the attachment is applicable to any known cotton planter of the type making use of a boot through which the seed is dropped when the planter is in use.

In carrying out the invention, I make use of a planter having a frame which may include a pair of side bars 1. The planter frame is movably supported, as by means of a wheel 2 which is mounted on an axle 3 to which the frame of the planter is attached. The hopper or seed magazine 4 is supported on the frame of the planter in any suitable known manner, as by means of the attaching members indicated at 5. The body of the seed hopper or magazine 4 is open at its lower end but seed is prevented from falling freely therefrom by means of a horizontal baffle plate 6 which cooperates with the inner wall of the body of the seed hopper or magazine to provide a discharge opening of restricted area at 7 in the lower part of the seed hopper. A shaft 8 which may be journaled in bearings in cross pieces 9 of the frame of the planter carries a seed picker wheel 10 which is partially received in the lower end of the seed hopper or magazine and functions when the shaft 8 is rotated to pick or pull seeds regularly from the seed hopper or magazine through the discharge orifice 7, The shaft 8 carries a bevel gear 11 in mesh with a large bevel gear 12 which is carried at the lower end of the short vertical shaft 13. The latter is rotatably supported at 14 in any suitable manner, as for example in an opening in the horizontal baffle plate 6.

As best seen in Figure 4 the side members 1 of the frame of the planter may rotatably support aligned horizontally disposed short shafts 15, 16 respectively. These shafts carry bevel gears 17 and 18 respectively in mesh with the bevel gear 12 at opposite sides of the latter. One of these short shafts, as the shaft 15, has a crank 19 secured thereto. This crank 19 is connected by a connecting rod 20 with a crank 21 on the axle 3. The seed picker shaft and the seed picker wheel will be rotated when the supporting wheel of the planter is turned. The gear 18 may serve as a stabilizing gear for cooperating with the gear 17 to prevent oscillation of the second motion gear 12.

The parts which have been described so far are ordinary with the exception that the shaft 8 is of greater length than is usual and extends rearwardly of the picker wheel for a purpose which will presently appear.

The attachment comprises a boot or seed feeding guide having a vertically disposed hollow tubular body 22 which is open at both its upper and lower ends and is suspended from the frame of the planter in any suitable known manner, as by means of the supporting bars 23 so that the open upper end of the boot will be directly beneath the seed picker wheel 10 and the discharge orifice 11 of the seed hopper of the planter. The upper end portion of the boot may be frusto-conical or otherwise enlarged toward its upper end as indicated at 24 and the walls of the body of the boot preferably are formed to be convexly curved longitudinally thereof at the lower end of the frusto-conical upper end portion, as indicated at 25 whereby an inwardly extending horizontal shoulder or abutment 26 will be defined at the juncture of the frusto-conical portion 24 and the portion 25 of the body of the boot.

A seed feeding valve for regulating the passage of seeds through the boot has a hub 27 which is secured on a horizontal shaft 28. The shaft 28 extends through aligned horizontal openings in opposite walls of the body of the boot and is journaled in aligned openings in bearing plates 29 and 30, respectively, which are secured on said opposite walls of the body of the boot. The valve comprises a plurality of regularly spaced blades or vanes 31 having the inner end portions thereof secured rigidly to the hub 27 and extending outward from the hub in planes which are shown as extending tangentially to the hub but which may extend radially of the hub. The position of the shaft 28 in the body of the boot and the length of the blades 31 are such that the valve may rotate about the axis of the horizontal shaft 28 in the portion 25 of the body of the boot and the outer and side edges of the blade will pass close to the faces of corresponding portions of the inner walls of the body of the boot just below the level of the shoulder 26 when the shaft 28 is rotated. As a consequence, seed dropping into the upper part of the body of the boot will fall upon the blades of the valve and will be fed by the latter to the space within the body of the boot below the valve, only such mass of seeds being permitted to drop at one time into the lower part of the body of the boot as can be received between two adjacent blades of the valve. The feeding of such masses or quantities of seeds will take place at regular intervals during each rotation of the shaft 28 and of the valve which is secured on the shaft 28. The shoulder 26 serves as a guard for preventing seeds from clogging between the valve and the adjacent walls of the body of the boot. It will be obvious that the number of droppings of quantities of seeds with each revolution of the valve and the quantity of seeds of which each dropping will be composed may be varied by varying the number of blades in the valve.

The shaft 28 extends beyond the bearing plate 29 and carries a spur gear 32 which is in mesh with a spur gear 33 on the rearwardly extending end portion of the picker wheel supporting shaft 8. The valve therefore will be turned by power which is derived from the supporting wheel of the planter and is transmitted to the valve supporting shaft through the same shaft that carries the picker wheel. It therefore will be manifest that the picker wheel and the valve will be rotated in opposite directions.

A furrow opening foot or shoe 34 of the usual shape is provided adjacent to its rearward end with an upstanding attaching arm 35 which is rigidly secured, as at 36, to an extension 37 at the lower edge of the bearing plate 30, whereby the foot 34 will be secured to the boot so that the lower extremity of the boot will be received between the spaced side members 38 of the foot and the seeds that pass into the lower end portion of the boot therefore will fall by gravity from the lower end of the boot to the space between the side members 38 of the foot adjacent to the rearward end of the foot and into the furrow that the foot makes when the planter is moved in a forward direction. The forward end of the foot 34 is stayed to the frame of the planter by a stay bar 39.

From the forgeoing description of the various parts of the device, the operation thereof may be readily understood. It will be manifest that the passage of seeds from the seed hopper or magazine of the planter to the lower part of the boot and thence through the foot 34 to the ground will be regulated by the valve when the planter is in use so that the seeds will be dropped at spaced intervals in piles. This will obviate the necessity of any extensive "thinning out" of the cotton plants, as is ordinarily required and moreover will properly space the plants in a row and will insure a better stand of plants in case unfavorable weather conditions should ensue, as when heavy rainstorms occur, as well as in more favorable circumstances so far as weather conditions are concerned. Moreover, the depositing of the seeds in piles will result in better production than is usual when boll weevils are present in the cotton field, since there will be several plants at each place or hill and the likelihood that boll weevils will destroy all the plants is correspondingly decreased. Moreover, the requirement for fertilizer will be reduced for a field of a given size when the seeds are planted in the field by means of a planter equipped with my improved seed feeding attachment.

The attachment can be conveniently applied to a planter of ordinary construction of the type having a boot through which the seeds drop from a seed hopper or magazine of the planter. When the seed has been planted through the use of the attachment, the attachment can be quickly and easily removed to permit the planter to be used in an ordinary manner for the planting of corn or other seeds.

Obviously, the invention is susceptible of embodiment in forms other than that which is illustrated in the accompanying drawing and I therefore consider as my own all modifications and adaptations thereof as fairly fall within the scope of the appended claim.

I claim:—

In a seed planter, a boot having a vertically disposed hollow body open at its upper and lower ends and suspended from the frame of the planter in position to receive seeds from a source of supply, said body of the boot having the upper end portion thereof substantially frusto-conical and having the portion thereof next to said frusto-conical portion formed with the walls thereof curved outwardly, thus defining an inwardly extending guard shoulder at the lower end of said frusto-conical portion and a vase-shaped boot portion below the frusto-conical portion, a horizontal shaft extending through the body of the boot below the level of said shoulder, a valve supported on said shaft within the body of said boot to turn about the axis of the shaft, said valve comprising a hub secured to said shaft, a plurality of plates or vanes removably secured as individual units to said shaft and tangential to said hub for substantial portions of their length, and means for rotating the shaft.

EDGAR W. FULLILOVE.